J. STACHURA.
INSECT TRAP.
APPLICATION FILED SEPT. 10, 1918.
1,287,494.
Patented Dec. 10, 1918.
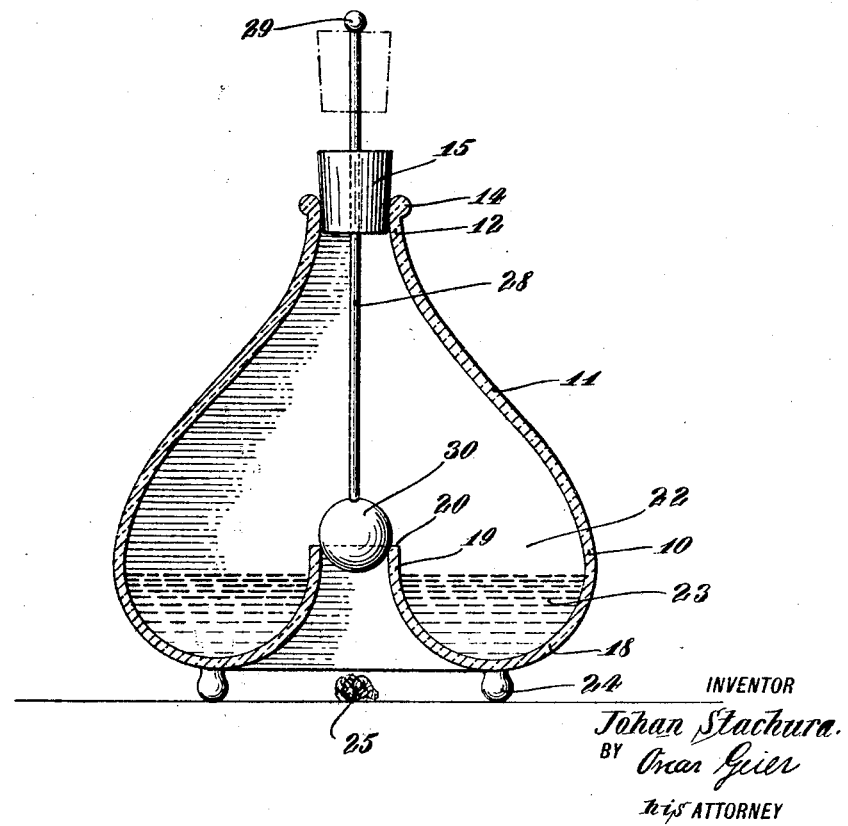
INVENTOR
Johan Stachura.
BY Oscar Geier
his ATTORNEY

UNITED STATES PATENT OFFICE.

JOHAN STACHURA, OF ST. PAUL, MINNESOTA.

INSECT-TRAP.

1,287,494.  Specification of Letters Patent.  Patented Dec. 10, 1918.

Application filed September 10, 1918. Serial No. 253,365.

*To all whom it may concern:*

Be it known that I, JOHAN STACHURA, a citizen of Poland, residing at St. Paul, county of Ramsey, and State of Minnesota, have invented certain new and useful Improvements in Insect-Traps, of which the following is a specification.

This invention relates to improvements in devices for catching and destroying small insects such as flies and the like, and has as its special object the provision of a receptacle having transparent walls and adapted to contain a liquid in which the entering flies become drowned.

A further object is to provide means whereby the entrance may be closed at any desired time, as at refilling the receptacle or if it be desired that the same is rendered inoperative.

These objects are attained by the novel construction and combination of parts hereinafter described and shown in the accompanying drawings, forming a material part of this disclosure, and in which is shown a vertical sectional view, taken on the center line of a fly trap made in accordance with the invention, showing the inner stopper in an applied position.

The receptacle is comprised of an enlarged circular base 10, having converging upper walls 11, joining the neck 12, which is furnished with a bending 14, as is usual with receptacles of this kind. An ordinary stopper, as a piece of cork 15, is used to cover the upper opening, the structure resembling a type of water bottle known as a carafe.

The lower, inner portion of the base 18, is curved upwardly, as at 19, presenting an open tubular top 20 in alinement with the mouth, and so disposed as to form an annular recess or chamber 22, adapted to hold liquid 23, the base being supported upon short integrally formed projecting legs 24, the same being adapted to rest upon any suitable level foundation whatever.

Passing through the cork or stopper 15, set in the mouth is a rod 28, provided with an operating knob 29 at its extreme upper end, while engaged at its lower end is a spherical stopper 30 adapted to make contact with the open tubular top 20, so as to close the opening therethrough.

In operation, the receptacle may be partially filled with water or other fluid, the same extending to a level slightly below the plane of the inner opening 20, and a lure 25 disposed directly therebelow, so that flies and insects may readily enter and then rising from the lure attracted by the transparent walls, enter the receptacle and eventually drop into the liquid and become drowned, and it will be obvious that they can be prevented from escaping by pushing the rod down, closing the opening 20.

Having thus described my invention what I claim as new and desire to secure by Letters Patent, is—

In a fly trap, the combination with a hollow transparent vessel having an enlarged annular base containing a chamber, a tubular projection extending upward in said base having an open top, legs integrally formed with said base on which the vessel is supported, a stopper removably engaged in the mouth of said vessel, a rod slidable through said stopper, means for operating said rod, and a spherical stopper at the end of said rod adapted to close the entrance through said tubular element in said base.

In testimony whereof I have affixed my signature.

JOHAN STACHURA.

Copies of this patent may be obtained for five cents each, by addressing the "Commissioner of Patents, Washington, D. C."